(12) United States Patent
Kaneko (10) Patent No.: US 6,646,739 B2
(45) Date of Patent: *Nov. 11, 2003

(54) FOUR-STAGE TYPE MONOCHROMATOR

(75) Inventor: Tsutomu Kaneko, Kanagawa (JP)

(73) Assignee: Ando Electric Co., Ltd., Kawasaki (JP)

( * ) Notice: Subject to any disclaimer, the term of this patent is extended or adjusted under 35 U.S.C. 154(b) by 65 days.

This patent is subject to a terminal disclaimer.

(21) Appl. No.: 09/829,875

(22) Filed: Apr. 10, 2001

(65) Prior Publication Data

US 2002/0021493 A1 Feb. 21, 2002

(30) Foreign Application Priority Data

Apr. 21, 2000 (JP) .......................................... 2000-121155

(51) Int. Cl.⁷ ................................................. G01J 3/18
(52) U.S. Cl. ...................................................... 356/334
(58) Field of Search ................................. 356/331, 332, 356/333, 334

(56) References Cited

U.S. PATENT DOCUMENTS 6,166,805 A * 12/2000 Mori et al. .................. 356/334

* cited by examiner

*Primary Examiner*—Tu T. Nguyen
(74) *Attorney, Agent, or Firm*—Fish & Richardson P.C.

(57) ABSTRACT

In a four-stage type monochromator, there is provided a returning reflector 6 for making the dispersing direction of the wavelength of light 13e and 13h incident on and emergent from a plane diffraction grating 4 is reversed before and after its reflection. Angles of incident and emergent light at a time when the light is spectrally separated by the diffraction grating 4 are made identical.

6 Claims, 7 Drawing Sheets

FOUR-STAGE TYPE MONOCHROMATOR

BACKGROUND OF THE INVENTION

1. Field of the Invention

The present invention relates to a four-stage type monochromator whose wavelength resolving power is improved with a small number of component parts and which has a high dynamic range.

2. Description of the Related Art

Figure 6:
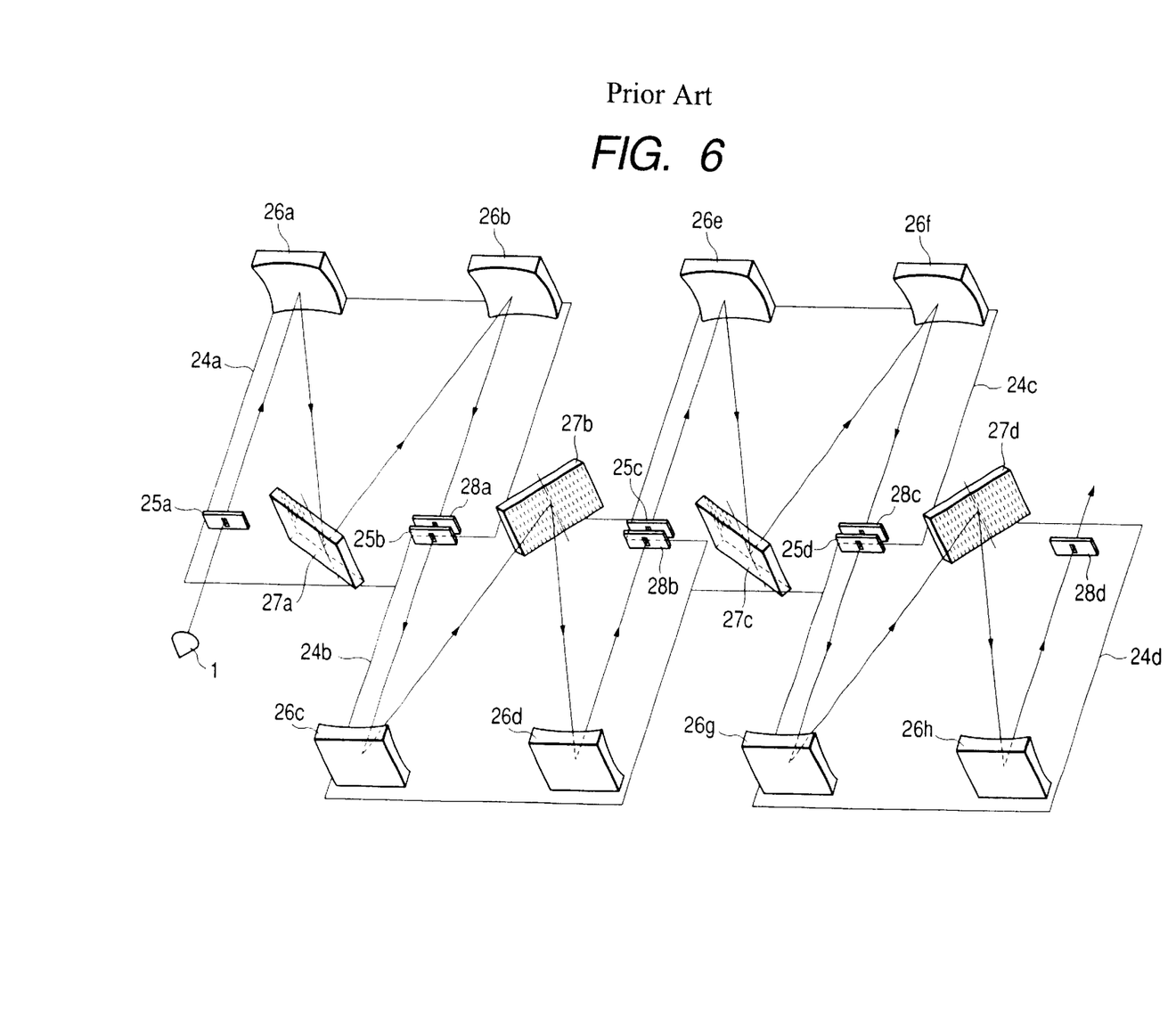
FIG. 6 is a diagram illustrating an example of a conventional four-stage type monochromator.

FIG. 6 shows an example of a conventional four-stage type monochromator. Reference numerals 24a to 24d denote monochromator units, and a single pass monochromator unit is formed by an entrance slit plate, a plane diffraction grating, an exit slit plate, and two concave mirrors. The incident light from a light source 1 is made incident through a slit in an entrance slit plate 25a, is converted to parallel light by a concave mirror 26a, and is made incident on a plane diffraction grating 27a. Of the incident light, a specific wavelength component, which is determined by an angle of rotation of the plane diffraction grating 27a having an axis parallel to the grating as its axis of rotation, is made emergent toward a concave mirror 26b as emergent light.

The reflected light from the concave mirror mirror 26b is made emergent through a slit in an exit slip plate 28a. The emergent light from the slit in the exit slit plate 28a is made incident on the double pass monochromator unit through a slit in an entrance slit plate 25b, is reflected by a concave mirror 26c toward a plane diffraction grating 27b, and is used as second diffracted emergent light. In the same way as the monochromator unit 24a, the plane diffraction grating 27b reflects the light at an angle which differs depending on the wavelength of the incident light, and a specific wavelength component, which is determined by the angle of rotation of the plane diffraction grating 27b having an axis parallel to the grating as its axis of rotation, is made emergent toward a concave mirror 26d as emergent light.

The reflected light from the concave mirror 26d is made emergent through a slit in an exit slit plate 28b, and is used as third-stage incident light. In the triple pass monochromator unit as well, diffraction similar to the second stage occurs, and its emergent light is used as incident light for fourth-stage incident light. In the fourth stage as well, diffraction occurs in a similar manner, and reflected light from a concave mirror 26h is made emergent from a slit in an exit slit plate 28d.

In such a configuration, if the angles of the plane diffraction gratings 27a to 27d are set such that the wavelengths passing through the respective monochromator units 24a to 24d become equal, of the incident light from the light source 1, only a specific wavelength component can be led out through the slit in the exit slit plate 28d of the monochromator unit 24d.

In such a configuration, the deviation of the angle of reflection at the wavelength occurring in the first diffraction becomes the deviation of the second incident light, and angular dispersion which is indicated by the angle of deviation of the angle of reflection per unit wavelength is added. As the angular dispersion is similarly added in the third and fourth diffraction as well, the amount of movement of an image per unit wavelength in the fourth-stage slit becomes large, so that it is possible to improve the wavelength resolving power at a position where the wavelength dropped by a predetermined level (3 dB) from a peak value of a mean wavelength λ. In addition, the exit slit plates are provided for the respective monochromator units 24a to 24d, and since passing wavelengths are selected, it is possible to obtain a high dynamic range.

Figure 7:
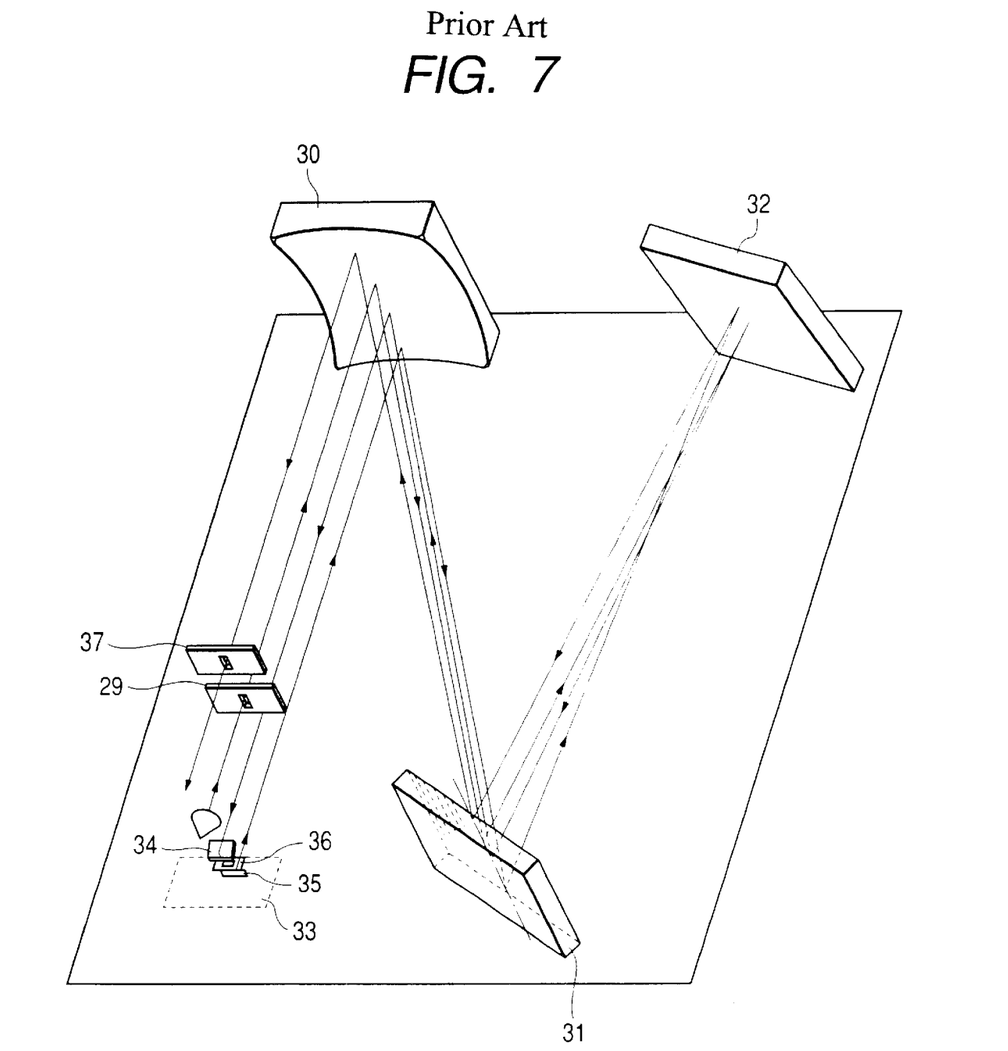
FIG. 7 is a diagram illustrating another example of a conventional four-stage type monochromator.

FIG. 7 shows another example of a conventional quadruple pass monochromator. This quadruple pass monochromator is comprised of an entrance slitplate, a plane diffraction grating, a concave mirror, and a plane mirror. The incident light from the light source is made incident through a slit in an entrance slit plate 29, is converted to parallel light by a concave mirror 30, and is made incident on a plane diffraction grating 31. Of the incident light, a specific wavelength component, which is determined by an angle of rotation of the plane diffraction grating 31 having an axis parallel to the grating as its axis of rotation, is made emergent toward a plane mirror 32 as emergent light. The emergent light is reflected by the plane mirror 32, and is made incident again on the plane diffraction grating 31. The second diffracted light from the plane diffraction grating 31 is reflected again by the concave mirror 30, and is made incident on a returning reflecting means 33.

The returning reflecting means in this example is formed by two plane mirrors and an intermediate slit plate, and emergent light from the returning reflecting means, from which only a specific wavelength component has been led out through a slit in an intermediate slit plate 36, is made incident on the concave mirror 30. The reflected light from the returning reflecting means is converted to parallel light by the concave mirror 30, and is made incident on the plane diffraction grating 31 as third incident light.

The third diffracted light from the plane diffraction grating 31 is reflected by the plane mirror 32, is made incident again on the plane diffraction grating 31 so as to be reflected as fourth diffracted light. The fourth diffracted light is reflected again by the concave mirror 30, and is focused onto a final slit plate 37 so as to select a passing wavelength.

In this example, since the wavelength of the emergent light is selected by causing the light to pass through two slits including the intermediate slit and the exit slit, it is possible to obtain a high dynamic range. However, although the angular dispersion which is indicated by the deviation of the angle of reflection per unit wavelength is added in the first and second diffraction, the angular dispersion is subtracted in the third and fourth diffraction in which the reflected light returning from the returning reflecting means is used as incident light. In the final slit, the dispersed light selected by the intermediate slit is recombined.

With the above-described first conventional example of the quadruple pass monochromator, four sets each comprised of two concave mirrors, two slit plates, and one plane diffraction grating which make up each monochromator unit are required, so that the number of component parts increases, and the size of the apparatus becomes large. In addition, since all the wavelengths of light transmitted through the monochromator units 24a to 24d must completely match, the plane diffraction gratings 27a to 27d must be rotated to such angles at which the light with the same wavelength is transmitted, a complicated synchronizing mechanism is necessary.

In addition, with the above-described second example of the quadruple pass monochromator, the deviation of the angle of reflection at the wavelength occurring in the first diffraction becomes the deviation of the second incident light, and the angular dispersion which is indicated by the angle of deviation of the angle of reflection per unit wavelength is added. However, in the third and fourth diffraction in which the reflected light returning from the returning reflecting means is used as incident light, since the deviation of the angle at the wavelength of the incident light is reversed, the angular dispersion of the emergent light from the diffraction grating is subtracted. In the final slit, the dispersed light selected by the intermediate slit is recombined, and in this aspect there has been a limit to the wavelength resolving power.

SUMMARY OF THE INVENTION

An object of the invention is to provide a four-stage type monochromator whose wavelength resolving power is improved with a small number of component parts and which has a high dynamic range.

To overcome the above-described problems, in accordance with the invention there is provided a four-stage type monochromator including a concave mirror for converting incident light to parallel light and for outputting the same; a plane diffraction grating for diffracting the parallel light; a plane mirror which has a reflecting surface substantially perpendicular to an optical path of the diffracted light diffracted by the plane diffraction grating and which reflects the diffracted light to cause the reflected light to be incident again on the plane diffraction grating; and returning reflecting means which returns the diffracted light which was diffracted again by the plane diffraction grating and was focused by the concave mirror, so as to cause the returned light to be incident again on the concave mirror, wherein the reflected light from the concave mirror is made incident upon the plane diffraction grating as third incident light, its diffracted light is reflected again by the plane mirror and is made incident on the plane diffraction grating as fourth incident light, so as to output the light diffracted by the plane diffraction grating and having a specific wavelength through a slit in an exit slit plate, characterized in that the returning reflecting means reverses a dispersing direction due to the wavelength of the light before and after its reflection.

By adopting the above-described arrangement, the diffraction grating diffracts the light four times in different dispersing directions, so that it becomes possible to obtain sufficient wavelength dissolving power with a small number of component parts. In addition, since the wavelength of the emergent light is selected by an intermediate slit and an exit slit provided in the returning reflecting means, it is possible to obtain a high dynamic range.

DETAILED DESCRIPTION OF THE DETAILED DESCRIPTION

Referring to the drawings, a description will be given of the mode for carrying out the invention on the basis of an embodiment.

Figure 1:
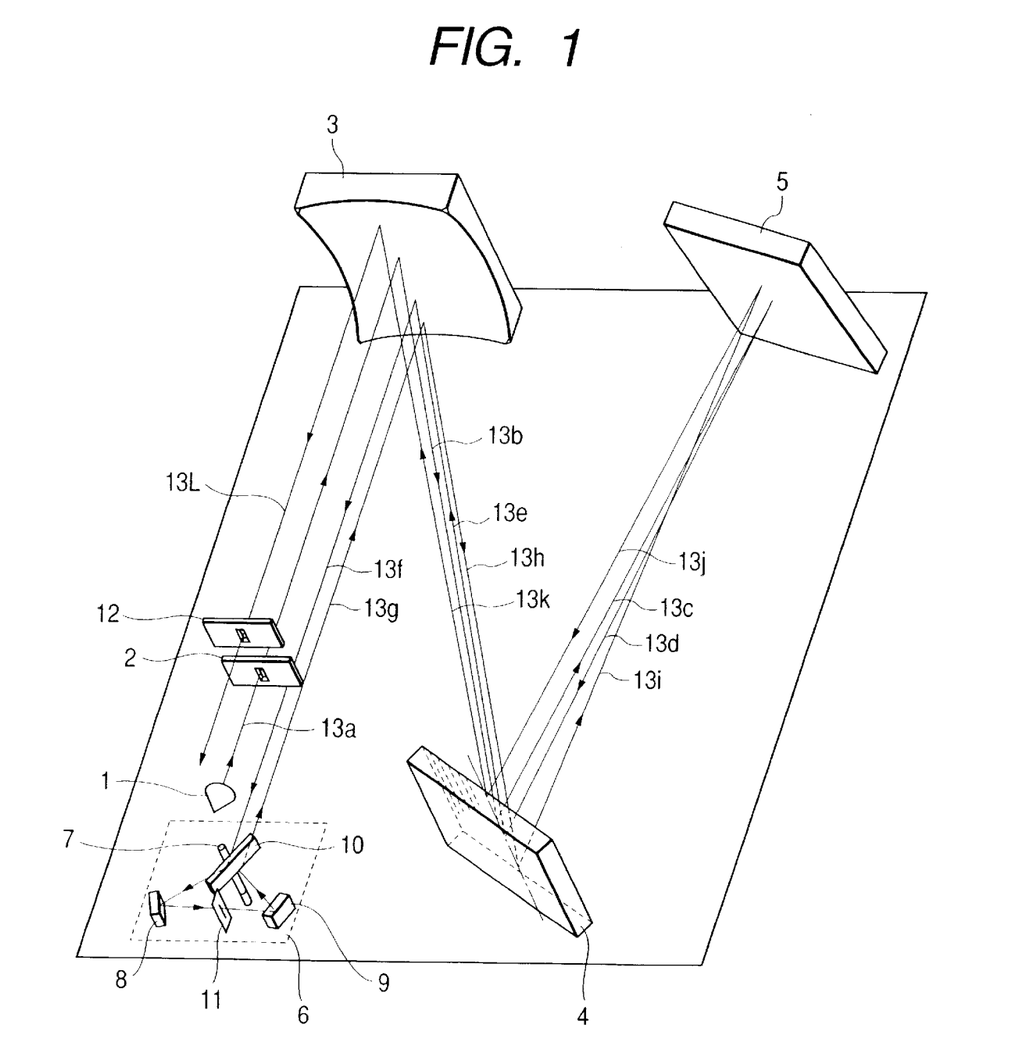
FIG. 1 is a diagram illustrating an example of a four-stage type monochromator in accordance with the invention.

FIG. 1 shows a first embodiment illustrating one example of a four-stage type monochromator in accordance with the invention. In FIG. 1, reference numeral 1 denotes a light source which emits light to be measured by this four-stage type monochromator. Numeral 2 denotes an entrance slit plate; 3, a concave mirror; 4, a diffraction grating; 5, a plane mirror; 6, a returning reflecting means; and 12, an exit slit plate. In this embodiment, the returning reflecting means 6 is comprised of four plane mirrors 7, 8, 9, and 10 and an intermediate slit plate 11.

The four-stage type monochromator of the invention differs from the conventional four-stage type monochromator shown in FIG. 7 in that the returning reflecting means 6 reverses the dispersing direction of the light before and after its reflection. In this four-stage type monochromator, the returning reflecting means is set as an arbitrary means capable of reversing the dispersing direction of the light.

In the four-stage type monochromator in this embodiment, the entrance slit plate 2 is disposed between the light source 1 and the concave mirror 3 so as to be used as an entrance slit plate, while the exit slit plate 12 is disposed at a focal point of the concave mirror 3 to select a specific wavelength from the fourth emergent light 13$k$, thereby selecting the resolved wavelength of the four-stage type monochromator.

In addition, the intermediate slit plate 11 is disposed at a focal point of the concave mirror 3 in the returning reflecting means 6 so as to select a diffraction wavelength in the third diffraction.

The entrance and exit slit plates and the intermediate slit plate are used after adjusting the widths and positions of the slits provided in the slit plates, in correspondence with the wavelength resolving power and the dynamic range of the four-stage type monochromator.

The concave mirror 3 converts incident light 13$a$ to parallel light, and causes the parallel light to be incident on the plane diffraction grating 4. After the parallel light from the plane diffraction grating 4 is reflected by the plane mirror 5 and diffracted again by the plane diffraction grating 4, the concave mirror 3 causes that diffracted light 13$e$ to be focused on the intermediate slit plate 11. Further, the concave mirror 3 causes reflected emergent light 13$g$, which was returned by the returning reflecting means 6, to be incident again on the plane diffraction grating 4 to effect third diffraction. After the third diffracted light from the plane diffraction grating 4 is reflected by the plane mirror 5 and subjected to fourth diffraction by the plane diffraction grating 4, the concave mirror 3 causes that diffracted light 13$k$ to be focused on the exit slit plate 12.

Figure 2:
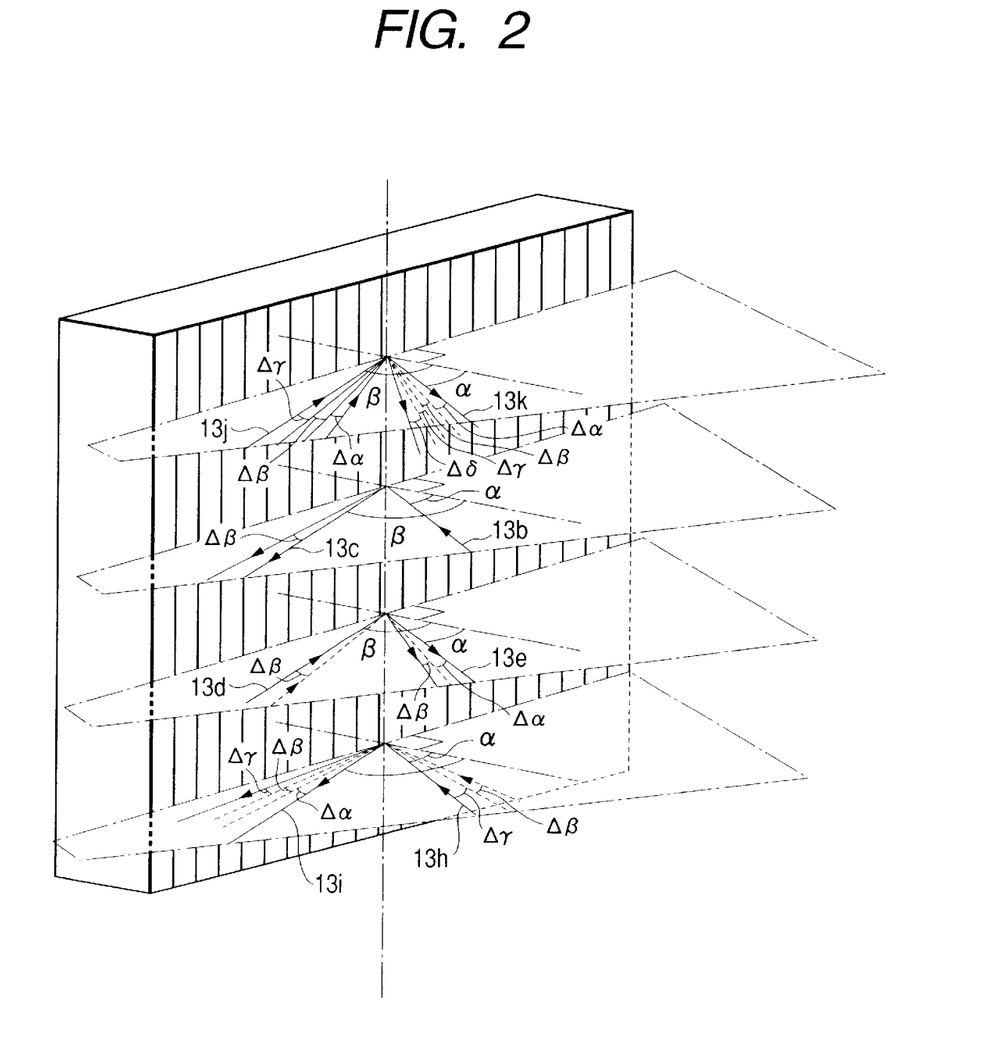
FIG. 2 is a perspective view illustrating an example of a state of light which is spectrally separated by a plane diffraction grating.

The plane mirror 5 is disposed so as to be perpendicular to a specific angle $\beta$ of the emergent light from the plane diffraction grating 4 shown in FIG. 2. The light at the angle $\beta$ is returned as incident light at the angle $\beta$ of incidence on the plane diffraction grating 4, and emergent light at an angle $\beta+\Delta\beta$ is returned as returned light at an angle $\beta-\Delta\beta$.

The incident light from the entrance slit plate 2 is converted to parallel light by the concave mirror 3, and is then made incident on the plane diffraction grating 4 at, for example, a predetermined angle of incidence $\alpha$. Diffracted light 13$c$ at the angle of diffraction $\beta$, which was diffracted by the plane diffraction grating 4, is reflected by the plane mirror 5. Since the plane mirror 5 is disposed perpendicularly to the angle of emergence $\beta$ of the light emergent from the plane diffraction grating 4, the diffracted light 13$c$ at the angle of diffraction $\beta$ is made incident on the plane diffraction grating 4 at the angle of incidence $\beta$. Then, incident light 13d is diffracted again by the plane diffraction grating 4, and is made emergent as the diffracted light 13e at the angle of diffraction α.

In addition, incident light 13b with a wavelength λ+Δλ incident on the plane diffraction grating 4 at the angle of incidence α is made emergent at the angle of diffraction β+Δβ, is reflected by the plane mirror 5, is made incident as incident light at the angle of incidence β−Δβ, and is diffracted again. In this case, the second diffracted light is made emergent as light at the angle of diffraction α−(Δα+Δβ).

The second diffracted light is focused on the intermediate slit plate 11 by the concave mirror 3, a specific wavelength range is selected by the slit width, is returned by the returning reflecting means 6, is converted to parallel light by the concave mirror 3, and is made incident on the plane diffraction grating 4 as the third incident light. Of the emergent light 13g from the returning reflecting means 6, light having the wavelength λ is incident on the plane diffraction grating 4 at the angle of incidence α, is reflected again by the plane mirror 5 as diffracted light 13i at the angle of diffraction β, and is made incident for the fourth time at the angle of incidence β.

Fourth incident light 13j is made emergent as the diffracted light 13k at the angle of diffraction α owing to diffraction. Meanwhile, the emergent light from the returning reflecting means at the wavelength λ+Δλ is made incident on the plane diffraction grating 4 at an angle of incidence α−(Δα+Δβ), is reflected again by the plane mirror 5 as diffracted light at an angle of diffraction β+(Δα+Δβ+Δγ), and is subjected to fourth incidence at an angle of incidence β−(Δα+Δβ+Δγ). The fourth diffracted light is made emergent at an angle of diffraction α+(Δα+Δβ+Δγ+Δδ) owing to diffraction.

The fourth emergent light is focused on the exit slit plate 12 by the concave mirror, and a specific wavelength range is selected by the exit slit plate 12. However, as for the light having the wavelength λ+Δλ, since its angle of emergence of diffracted light is α+(Δα+Δβ+Δγ+Δδ), the position where that light is focused on the slit plate is located away from that of the wavelength λ, so that the resolving power improves.

First Embodiment

The first embodiment of the invention is shown in FIG. 1.

The four-stage type monochromator shown in FIG. 1 is comprised of the concave mirror 3 on which the incident light 13a from the light source 1 is made incident through the slit in the entrance slit plate 2, and which converts the incident light 13a to parallel light and causes the parallel light to be emergent; the plane diffraction grating 4 for diffracting the parallel light 13b emergent from the concave mirror 3; the plane mirror 5 which has a reflecting surface substantially perpendicular to the optical path of the diffracted light 13c diffracted by the plane diffraction grating 4 and which reflects the diffracted light 13c to cause the reflected light 13d to be incident again on the plane diffraction grating 4; and the returning reflecting means 6 which reflects incident light 13f incident upon it from the concave mirror 3 after the light was diffracted again by the plane diffraction grating 4 as the diffracted light 13e and was focused by the concave mirror 3, wherein the reflected light from the concave mirror 3 is made incident upon the plane diffraction grating 4 as third incident light 13h, its diffracted light 13i is reflected by the plane mirror 5 as the fourth incident light 13j and is made incident on the plane diffraction grating 4, so as to output only light having a specific wavelength through the slit in the exit slit plate 12. This four-stage type monochromator is arranged such that the returning reflecting means 6 has a means for reversing the dispersing direction of the light before and after its reflection.

By virtue of this configuration, in the first embodiment, the incident light 13a from the entrance slit plate 2, after being converted to parallel light by the concave mirror 3, is made incident on the plane diffraction grating 4. The diffracted light 13c diffracted by the plane diffraction grating 4 at a specific angle is reflected by the plane mirror 5. Since the plane mirror 5 is disposed perpendicularly to the angle of emergence, the diffracted light 13c at the angle of diffraction β is made incident on the plane diffraction grating 4 at the angle of incidence β, and the diffracted light at β+Δβ is returned at the angle of incidence β−Δβ and is made incident. As for the second diffracted light 13e caused by the plane diffraction grating 4, the light having the wavelength λ is made emergent at the angle of emergence α, while the light having the wavelength λ+Δλ is made emergent at the angle of emergence α−(Δα+Δβ), and these components of light are made incident on the returning reflecting means 6 by the concave mirror 3.

The returned and reflected emergent light 13g from the returning reflecting means 6 is made incident on the concave mirror 3, is thereby converted to parallel light, and is made incident on the plane diffraction grating 4. The light having the wavelength λ is made incident on the plane diffraction grating 4 at the angle of incidence α, while the light having the wavelength λ+Δα is made incident on the plane diffraction grating 4 at the angle of incidence α+(Δα+Δβ). As for the third diffracted emergent light 13i caused by the plane diffraction grating 4, the light having the wavelength λ is made emergent at the angle of emergence β, while the light having the wavelength λ+Δλ is made emergent at the angle of emergence β+(Δα+Δβ+Δγ), and these components of light are made incident again on the plane mirror 5.

As for the diffracted light incident on the plane mirror 5, the light having the wavelength λ is returned again at the angle of emergence β, while the light having the wavelength λ+Δλ is returned again at the angle of emergence β+(Δα+Δβ+Δγ), and these components of light become the fourth incident light 13j incident on the plane diffraction grating 4. As for the fourth diffracted light 13k, the light having the wavelength λ is made incident on the concave mirror 3 at the angle of emergence α, while the light having the wavelength λ+Δλ is made incident on the concave mirror 3 at the angle of emergence α−(Δα+Δβ+Δγ+Δδ), and these components of light are made incident on the concave mirror 3 and are then focused on the exit slit plate 12.

At this juncture, although the emergent diffracted light is selected by this exit slit plate 12, since the difference of the wavelength Δλ is (Δα+Δβ+Δγ+Δδ), the position where the light having the wavelength λ+Δλ is focused on the exit slit plate 12 is located away from that of the wavelength λ, thereby improving the wavelength resolving power.

Figure 3:
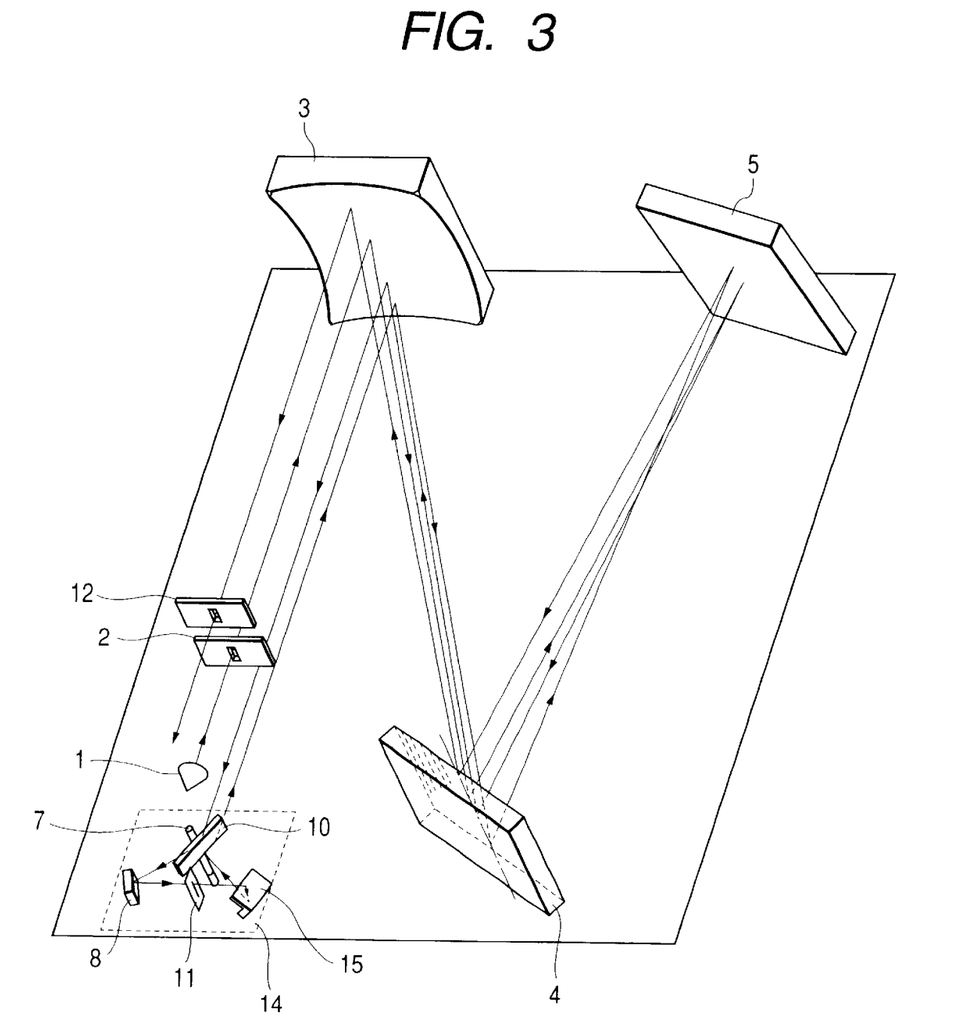
FIG. 3 is a diagram illustrating another example of the four-stage type monochromator in accordance with the invention.

In FIG. 3 illustrating a second embodiment, the portion of the returning reflecting means 6 in the four-stage type monochromator shown in FIG. 1 illustrating the first embodiment is configured as a returning reflecting means 14. In this embodiment, the returning reflecting means 14 is arranged such that the plane mirror 9 of the returning reflecting means 6 described with reference to FIG. 1 is substituted by a rectangular prism 15, and by adopting this arrangement the direction perpendicular to the dispersing direction of the light is made identical before and after the reflection. The incident light which entered through the slit in the entrance slit plate 2 is made incident on the plane diffraction grating 4 by the concave mirror 3 in the same way as the first embodiment, and the second diffracted light which is returned and made emergent is made incident on the returning reflecting means 14 by the concave mirror 3. The returning reflecting means 14 is formed by the three plane mirrors 7, 8, and 10 and the rectangular prism 15, and makes identical the direction perpendicular to the dispersing direction of the light before and after its reflection to obtain the returned emergent light.

As for the returned reflected emergent light, a specific wavelength range is selected by the intermediate slit plate 11 making up a part of the returning reflecting means. The emergent light from the returning reflecting means is made third incident light on the plane diffraction grating 4 by the concave mirror 3. In the same way as the first embodiment, the fourth diffracted light returned by the plane diffraction grating 4 and the plane mirror is focused on the exit slit plate 12 by the concave mirror 3, thereby selecting a specific wavelength.

Third Embodiment

Figure 4:
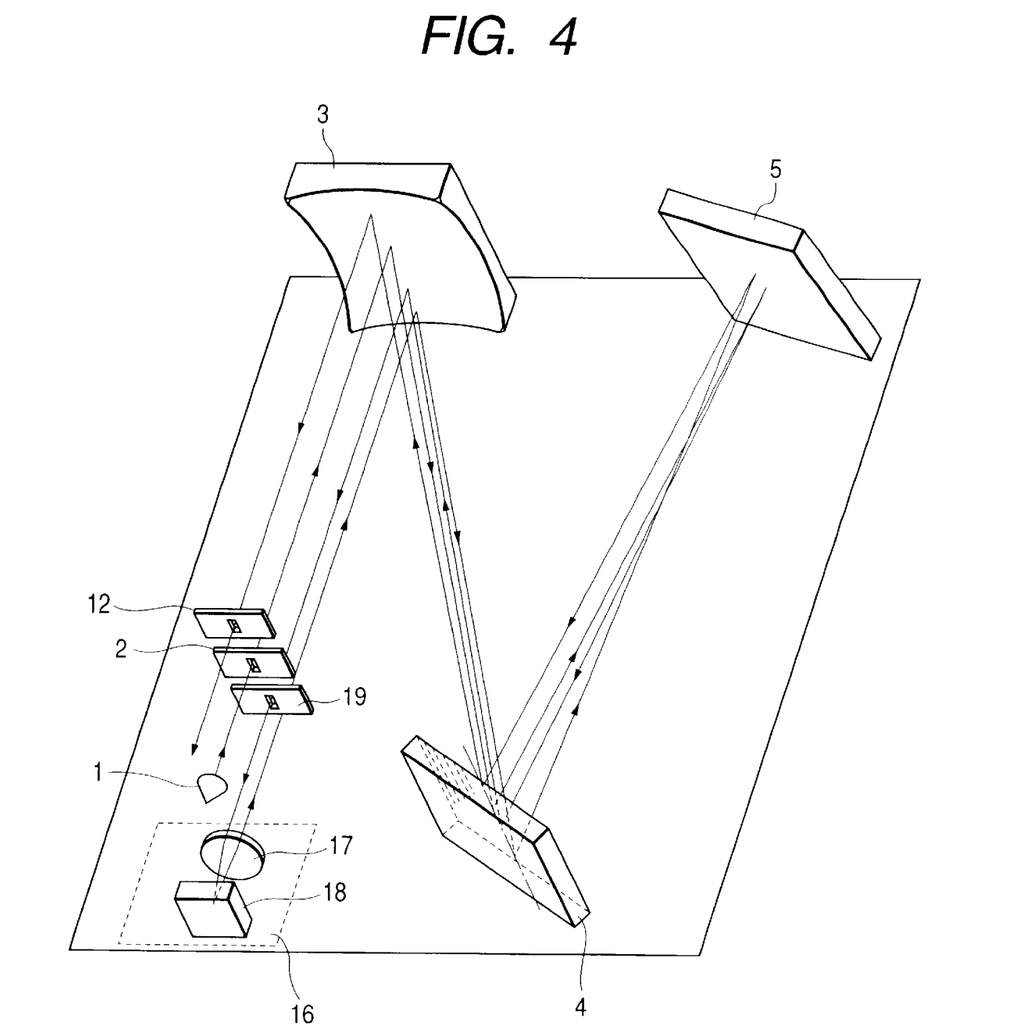
FIG. 4 is a diagram illustrating still another example of the four-stage type monochromator in accordance with the invention.

In FIG. 4 illustrating a third embodiment, the portion of the returning reflecting means 6 shown in FIG. 1 is configured as a returning reflecting means 16, which is comprised of a collimator lens 17 for converting to parallel light the light which passed through a slit in an intermediate slit plate 19, as well as a plane mirror 18 for reflecting the parallel light toward the plane diffraction grating 4 through the collimator lens. As this configuration is provided, the optical axis of the collimator lens 17 is moved in parallel in the direction of the grating of the plane diffraction grating 4 with respect to the center line of the second emergent light.

In the same way as the first embodiment, the second diffracted light, which was made incident on the plane diffraction grating 4 by the concave mirror 3 and was returned and made emergent, is made incident on the returning reflecting means 16 by the concave mirror 3. The returning reflecting means 16 is formed by the collimator lens 17, the plane mirror 18, and the intermediate slit plate 19, makes identical the direction perpendicular to the dispersing direction before and after the reflection, and makes the dispersing direction of the collimator lens 17 identical before and after the reflection, so as to obtain the returned emergent light.

As for the returned reflected emergent light, a specific wavelength range is selected by the intermediate slit plate 19 making up a part of the returning reflecting means 16. The emergent light from the returning reflecting means is made third incident light on the plane diffraction grating 4 by the concave mirror 3. In the same way as the first embodiment, the fourth diffracted light returned by the plane diffraction grating 4 and the plane mirror is focused on the exit slit plate 12 by the concave mirror 3, thereby selecting a specific wavelength.

In the four-stage type monochromator in accordance with the invention, in the first to third embodiments described above, it is possible to use an output aperture of a fiber instead of the entrance slit plate 2. Furthermore, an arrangement may be provided such that the concave mirror 3 is substituted by a collimator lens, while the collimator lens 17 is replaced by a concave mirror.

Figure 5:
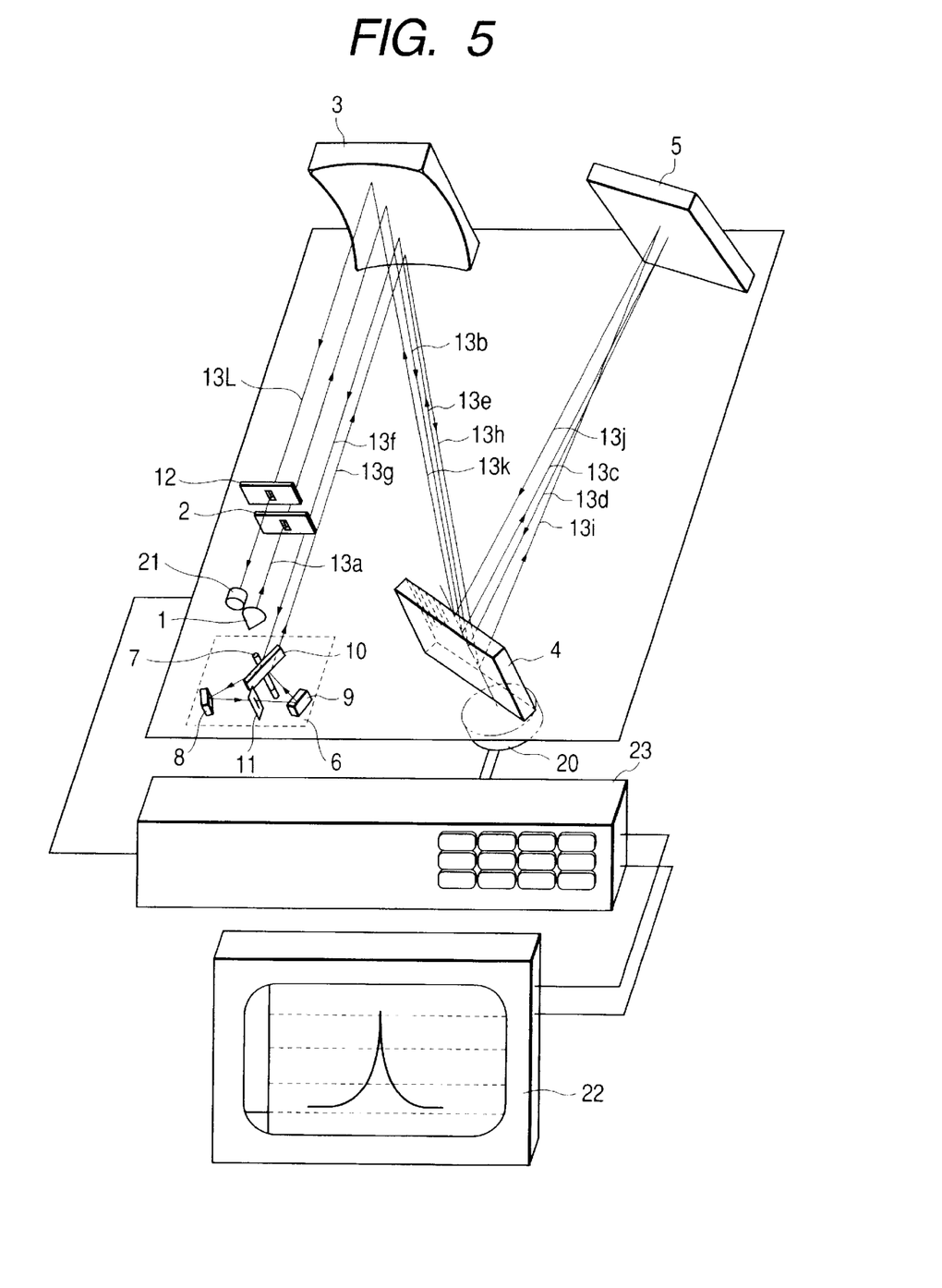
FIG. 5 is a diagram illustrating an example of an optical spectrum analyzer in accordance with the invention.

FIG. 5 shows an example of the configuration of an optical spectrum analyzer in which the four-stage type monochromator in accordance with the first embodiment is provided with a rotating mechanism 20 for rotating the plane diffraction grating 4, a light receiving unit 21 for receiving emergent light from the exit slit, a display unit 22 capable of displaying the spectrum, and a control unit 23 for operating and controlling them, and which is capable of measuring the wavelength and intensity of the incident light and displaying its spectrum on the screen. Of the source incident light which was made incident, a component of a specific wavelength which is determined by the angle of the plane diffraction grating is made emergent from the exit slit, and is received by the light receiving unit. Angular control of the plane diffraction grating and measurement of the intensity of the received light at that time are performed by the control unit, and the wavelength of the light is displayed on the display unit as the abscissa, while the intensity of the light is displayed as the ordinate, thereby forming an optical spectrum analyzer.

Although FIG. 5 shows the example of the configuration of an optical spectrum analyzer in which the four-stage type monochromator shown in the first embodiment is provided with the rotating mechanism 20 for rotating the plane diffraction grating 4, the light receiving unit 21 for receiving emergent light from the exit slit, the display unit 22 capable of displaying the spectrum, and the control unit 23 for operating and controlling them, and which is capable of measuring the wavelength and intensity of the incident light and displaying its spectrum on the screen, it goes without saying that similar optical spectrum analyzers can be also formed by using the four-stage type monochromators in accordance with the second and third embodiments shown in FIGS. 1 and 3.

If an optical spectrum analyzer is formed by the four-stage type monochromator in accordance with the invention, it is possible to obtain an optical spectrum analyzer whose wavelength resolving power is improved and which has a high dynamic range.

In accordance with the invention, since the returning reflecting means has the means for reversing the dispersing direction of the light before and after its reflection, the four-stage type monochromator is able to improve the wavelength resolving power with a small number of component parts, and it is possible to obtain a high dynamic range.

In addition, if the four-stage type monochromator in accordance with the invention is provided with a rotating mechanism for rotating the plane diffraction grating, a light receiving unit for receiving emergent light from the slit in the exit slit, a display unit capable of displaying a spectrum, and a control unit for operating and controlling them, so as to measure the wavelength and intensity of the incident light and display its spectrum on the screen, it is possible to provide an optical spectrum analyzer whose wavelength resolving power is improved and which has a high dynamic range.

What is claimed is:

1. A four-stage type monochromator, comprising:
    a concave mirror for converting incident light which passed through a slit in an entrance slit plate into parallel light to output the parallel light;
    a plane diffraction grating for diffracting the parallel light emergent from said concave mirror;
    a plane mirror having a reflecting surface substantially perpendicular to an optical path of the diffracted light diffracted by said plane diffraction grating, for reflecting the diffracted light to cause the reflected light to be incident again on said plane diffracting grating; and
    a returning reflector for reflecting the diffracted light diffracted again by said plane diffraction grating and focused by said concave mirror;

wherein the reflected light from said concave mirror is made incident upon said plane diffraction grating as third incident light, the diffracted light is reflected by said plane mirror and is made incident on said plane diffraction grating as fourth incident light, so as to output only light having a specific wavelength through a slit in an exit slit plate; and wherein said returning reflector includes a member for reversing a dispersing direction of the light before and after reflection.

2. The four-stage type monochromator according to claim 1, wherein angles of the incident and emergent light with respect to a grating surface of said plane diffraction grating when the light is spectrally separated by said plane diffraction grating are made identical in the first and third diffraction.

3. The four-stage type monochromator according to claim 1, wherein said returning reflector makes identical a direction perpendicular to the dispersing direction of the light before and after its reflection.

4. The four-stage type monochromator according to claim 3, further comprising an intermediate slit plate for allowing a specific wavelength component to pass through;

wherein said returning reflector has a collimator lens for converting the light which passed through to parallel light and a plane mirror for reflecting the parallel light toward said plane diffraction grating via said collimator lens; and wherein an optical axis of said collimator lens moves in parallel in a direction of the grating of said plane diffraction grating with respect to a center line of returned emergent light.

5. The four-stage type monochromator according to claim 3, wherein said returning reflector comprises a concave mirror.

6. The four-stage type monochromator according to claim 1, wherein said concave mirror replaced by a collimator lens.

* * * * *